(12) United States Patent
Schwinke et al.

(10) Patent No.: US 7,305,236 B2
(45) Date of Patent: Dec. 4, 2007

(54) METHOD OF CELLULAR CONNECTIVITY REPORTING

(75) Inventors: Steven P. Schwinke, Plymouth, MI (US); William E. Mazzara, Jr., Drayton Plains, MI (US); William E. Italia, Howell, MI (US)

(73) Assignee: General Motors Corporation, Detroit, MI (US)

( * ) Notice: Subject to any disclaimer, the term of this patent is extended or adjusted under 35 U.S.C. 154(b) by 487 days.

(21) Appl. No.: 10/151,578

(22) Filed: May 17, 2002

(65) Prior Publication Data

US 2004/0203728 A1    Oct. 14, 2004

(51) Int. Cl.
*H04Q 7/20*     (2006.01)
*H04M 1/24*    (2006.01)

(52) U.S. Cl. .................................. 455/425; 379/32.01

(58) Field of Classification Search ........ 455/423–425, 455/456.1, 456.6, 67.11, 115.1 TO, 115, 455/4, 226.1 TO, 226.4; 379/32.01, 32.05
See application file for complete search history.

(56) References Cited

U.S. PATENT DOCUMENTS 5,526,357 A  *  6/1996  Jandrell ...................... 370/346
6,169,896 B1 * 1/2001  Sant et al. ................... 455/424
6,594,280 B1 * 7/2003  Chapman ..................... 370/469

\* cited by examiner

*Primary Examiner*—Duc M. Nguyen
*Assistant Examiner*—Michael Thier

(57) ABSTRACT

The invention provides a method of reporting connectivity of a mobile vehicle. A call request fails, a failure type of the failed call request is determined, a time of the failed call request is determined, a location of the vehicle when the failed call request occurred is determined, and the failure type, the time of the failed call request, and the location of the vehicle when the failed call request occurred are stored.

10 Claims, 4 Drawing Sheets

METHOD OF CELLULAR CONNECTIVITY REPORTING

FIELD OF THE INVENTION

This invention relates generally to a method for reporting connectivity problems in a mobile phone system.

BACKGROUND OF THE INVENTION

With increased cellular traffic and a higher demand for reliable service, the management of unconnected calls has become more critical. The proliferation of mobile phone users continues to create challenges that may require assessing connectivity problems on mobile phone systems. System reliability becomes more critical, particularly to call centers that manage services to and from mobile vehicles. To improve system reliability, a telemetric call center would benefit from a method by which it can determine and diagnose where connectivity problems exist and solve them.

Mobile phones and telemetric units in mobile vehicles use prescribed frequencies in the 800 MHz analog band and in the 800 MHz, 900 MHz, 1900 MHz and higher digital cellular bands. While digital transmission technologies such as TDMA (time division multiple access), CDMA (code division multiple access) and GSM (global system for mobile telecommunications) have further increased the call capacity of digital cellular phone systems, the number of personal voice, data and telemetric calls also are continuing to multiply and are requiring higher transmission capacity. This additional traffic may result in more failed call attempts and dropped calls.

With no automatic or systematic way of detecting when and where calls are not connected, telemetric call centers may have difficulties in detecting, diagnosing and correcting connectivity problems in wireless carrier systems. Therefore, telemetric call centers would benefit from regular notification of connectivity problems and where, when, and why those problems exist. In that way, the systems of preferred wireless carriers would be monitored for satisfactory performance. Adjustments may be made to the mobile phone and modem in the telemetric unit, resulting in increased reliability of the telemetric services.

Ideally, the method of reducing connectivity problems would require no intervention from the user of a mobile phone or telemetric service unit in a mobile vehicle. A mobile phone or telemetric service unit would be able to proactively make intelligent decisions concerning connectivity and when queried, send reports about failed connections to the call center. With the information on failed call attempts, a telemetric call center would identify problems with wireless carrier systems more quickly, adjust its own systems and choice of carriers for better connectivity, and send any needed changes back to the mobile phone including updates to mobile phones, modems and their roaming lists. In addition, a call center could ascertain connectivity issues of specific cellular markets.

It would be desirable, therefore, to provide a method of reporting connectivity problems of a mobile vehicle that would result in monitoring the service provided by wireless carrier systems, increasing the reliability of telemetric services, and overcoming the deficiencies and obstacles described above.

SUMMARY OF THE INVENTION

One aspect of the invention provides a method of reporting connectivity of a mobile vehicle. A call request may fail and failure type of the failed call request may be determined. A time of the failed call request may be determined. The location of the vehicle when the failed call request occurred may be determined. The failure type, the time of the failed call request, and the location of the vehicle may be stored.

The failure type may be selected from a group consisting of an intercept notification, a reorder notification, an access denied notification, a mobile phone failure notification, a carrier-loss timeout notification, a data transfer failure notification, and a wireless modem failure notification. The time of the failed call request may be based on a global positioning system unit time stamp. The location of the vehicle may be comprised of a longitude coordinate output and a latitude coordinate output from a global positioning system unit.

The method also may include updating an in-vehicle system identifier table based on the failure type, the time of the failed call request, and the location of the vehicle when the failed call request occurred. An in-vehicle wireless modem may be updated based on the failure type, the time of the failed call request, and the location of the vehicle when the failed call request occurred.

The failure type, the time of the failed call request, and the location of the vehicle may be sent to a call center database. They may be sent automatically. They may be sent periodically. They may be sent in response to a query from a telemetric call center. The call center may send an update instruction to the mobile vehicle to reconfigure a system identifier table.

Another aspect of the invention provides a computer usable medium including a program for reporting connectivity in a mobile vehicle. The computer program may include code for receiving a failed call request, determining a failure type of the failed call request, determining a time of the failed call request, determining a location of the vehicle when the failed call request occurred, and storing the failure type, the time of the failed call request, and the location of the vehicle when the failed call request occurred.

The computer program also may include code for updating an in-vehicle system identifier table based on the failure type, the time of the failed call request, and the location of the vehicle when the failed call request occurred. The program may include code for sending the failure type, the time of the failed call request, and the location of the vehicle when the failed call request occurred to a call center database. The program also may include code for sending an update instruction from the telemetric call center to reconfigure an in-vehicle system identifier table.

Another aspect of the current invention provides a mobile vehicle connectivity reporting system, comprising a means for receiving a failed call request, a means for determining a failure type of the failed call request, a means for determining a time of the failed call request, a means for determining the location of the vehicle when the failed call request occurred, and a means for storing the failure type, the time of the failed call request, and the location of the vehicle when the failed call request occurred.

The connectivity reporting system may include a means for updating an in-vehicle system identifier table based on the failure type, the time of the failed call request, and the location of the vehicle when the failed call request occurred. The system may include a means for sending the failure type, the time of the failed call request, and the location of the vehicle when the failed call request occurred to a call center database. The system also may include a means for sending an update instruction from the call center to reconfigure an in-vehicle system identifier table.

Another aspect of the invention provides a telemetric unit for reporting connectivity in a mobile vehicle. The telemetric unit may comprise a digital signal processor, a mobile phone connected to the digital signal processor, a wireless modem connected to the digital signal processor, a global positioning system unit connected to the digital signal processor, and an in-vehicle memory connected to the digital signal processor. A failure type of a failed call request, a time of the failed call request, and a location of the vehicle may be stored in the in-vehicle memory by the digital signal processor.

The aforementioned, and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
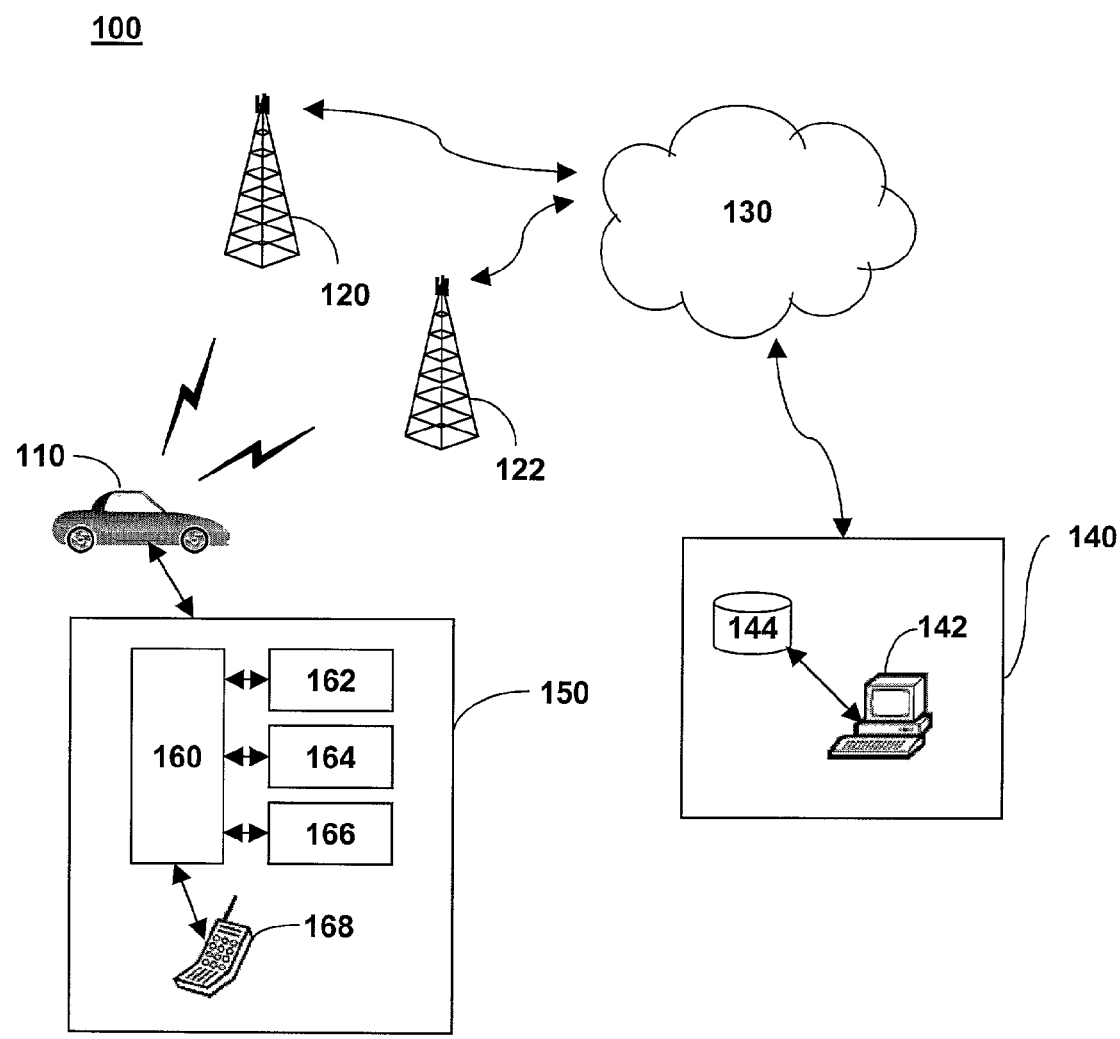
FIG. 1 is a schematic diagram of one embodiment of a system for reporting connectivity of a mobile vehicle in accordance with the current invention.

FIG. 1 shows one embodiment of a system for reporting connectivity of a mobile vehicle in accordance with the present invention at 100. The system for reporting connectivity may include one or more mobile vehicles 110; one or more wireless carrier systems 120, 122; one or more telephone networks 130; one or more telemetric call centers 140; and an on-board mobile telemetric unit 150.

Mobile vehicle 110 may be any vehicle equipped with on-board mobile telemetric unit 150. Wireless carrier system 120, 122 may be any suitable system for transmitting a signal from mobile vehicle 110 to telephone network 130.

Wireless carrier system 120, 122 also may transmit a signal from telephone network 130 to mobile vehicle 110. Wireless carrier system 120, 122 may be a wireless carrier system as is well known in the art. Wireless carrier system 120, 122 may be, for example, a cellular phone base station or cell site. Wireless carrier system 120, 122 may contain a plurality of base stations or cell sites.

Wireless carrier system 120, 122 may transmit a signal to telephone network 130. Telephone network 130 may contain, for example, a mobile telephone switching office. Telephone network 130 may contain, for example, a public switched telephone network. Telephone network 130 may contain, for example, suitable hardware and software for connecting wireless carrier system 120, 122 to telemetric call center 140.

Mobile vehicle 110, wireless carrier system 120, 122 and telephone network 130, operating in conjunction with each other, may form a mobile or cellular phone system. The cellular phone system may be, for example, an analog cellular phone system operating on a prescribed band between approximately 824 MHz and 894 MHz. The cellular phone system may be, for example, a digital cellular phone system operating on a prescribed 800 MHz, 900 MHz, 1900 MHz or other band suitable for carrying wireless communications.

Telephone network 130 may be any suitable system for connecting wireless carrier system 120, 122 to telemetric call center 140. Telephone network 130 may include one or more media for transmission of signals between telephone network 130 and telemetric call center 140. Media for transmission of signals may include, for example, electrical wire, optical fiber, or radio frequency links.

Telemetric call center 140 may be equipped to communicate with telephone network 130. Telemetric call center 140 may include, for example, any individual or system with hardware and software capable of communicating with telephone network 130. Telemetric call center 140 may include computer 142 connected to database 144. Data from telemetric unit 150 may be relayed to database 144 via wireless carrier systems 120, 122, telephone network 130 and computer 142 at telemetric call center 140. In reverse, telemetric service information, which may be processed by computer 142 and stored in database 144, may be relayed to telemetric unit 150 via telephone network 130 and wireless carrier systems 120, 122.

Telemetric services may be any data-capable wireless communications sent to mobile vehicles. They may include, but not be limited to, geographical positioning, navigational, electronic mail, facsimile data, Internet, voice-recognition, fleet management, safety monitoring, theft monitoring, wireless business, cellular radio, infotainment, and other multimedia or data transmission services. Personal calls may consist of voice telephony, short message, paging, voice mail, call forwarding, caller identification, call waiting, conference calling, and other personal communication services.

Telemetric unit 150 in mobile vehicle 110 may attempt to send call information or a service request to telemetric call center 140 via wireless carrier systems 120, 122 and telephone network 130. Telemetric call center 140 may attempt to send telemetric service or system-identifier table (roaming list) updates to telemetric unit 150 via telephone network 130 and wireless carrier systems 120, 122.

Telemetric unit 150 may include digital signal processor 160 connected to wireless modem 162, global positioning system (GPS) unit 164, in-vehicle memory 166, and in-vehicle mobile phone 168. GPS unit 164 may give longitude and latitude coordinates of the vehicle when the failed call request occurred.

Telemetric unit 150 may originate a call request that fails. The call may be a telemetric service request or a personal call from in-vehicle mobile phone 168. The failure may be due to problems with particular wireless carrier systems 120, 122. The failure may be due to problems connecting with telemetric call center 140. A personal call through wireless carrier system 120 and telephone network 130 may fail. A telemetric service request through wireless carrier system 120 and telephone network 130 to telemetric call center 140 may fail. The failure may occur at telemetric call center 140. The failure may be due to equipment failure of telemetric unit 150.

When a call request fails, digital signal processor 160 may determine which wireless carrier system 120, 122 was used, as well as a call type, failure type, time, and location of mobile vehicle 110 when the failure occurred, and store that information in in-vehicle memory 166. A call type may be, for example, a personal call, a telemetric service call, or a test call. The information may be obtained from failure notifications including an intercept notification, a reorder notification, an access denied notification, a mobile phone failure notification, a carrier-loss timeout notification, a data transfer failure notification, and a wireless modem failure notification.

Telemetric unit 150 may receive an intercept notification from wireless carrier system 120, 122 indicating that no phone service is available. Telemetric unit 150 may receive a reorder notification from wireless carrier system 120, indicating that all switching paths are in use, the call from in-vehicle mobile phone 168 failed, and an attempt was made to send the call through another wireless carrier system 122.

Telemetric unit 150 may receive a mobile phone failure notification. Telemetric unit 150 may receive a carrier-loss timeout notification from wireless modem 162 when, for example, wireless modem 162 and wireless carrier system 120, 122 are unable to progress through their handshaking routine, i.e. they cannot complete their initial supervisory and signaling circuit routines. The carrier-loss timeout notification also may be received when, for example, there is a bad voice channel or modem problems.

Telemetric unit 150 may receive a data transfer failure notification. Telemetric unit 150 may receive a wireless modem failure notification. Telemetric unit 150 may receive an access denied notification from wireless carrier systems 120, 122 when, for example, in-vehicle mobile phone 168 or telemetric unit 150 is not authorized for service from wireless carrier systems 120, 122 and a credit card charge is required to obtain service. Telemetric unit 150 may receive other types of notification failures including those concerning itself, mobile vehicle 110, and voice or data transfer problems.

Digital signal processor 160 may instruct in-vehicle memory 166 to store information including a failure type of a failed call request, a time of the failed call request, a location of the vehicle when the failed call request occurred and identification of wireless carrier system 120, 122 with which the call request failed. This failed call request information also may be sent from telemetric unit 150 to database 144 of telemetric call center 140 via wireless carrier system 120, 122, and telephone network 130. The failed call request information may be sent automatically. The information may be sent periodically, such as a prescribed time of every thirty days, for example. The information may be sent in response to a query by telemetric call center 140. Telemetric unit 150 may send or receive information whether mobile vehicle 110 is running or not.

Figure 2:
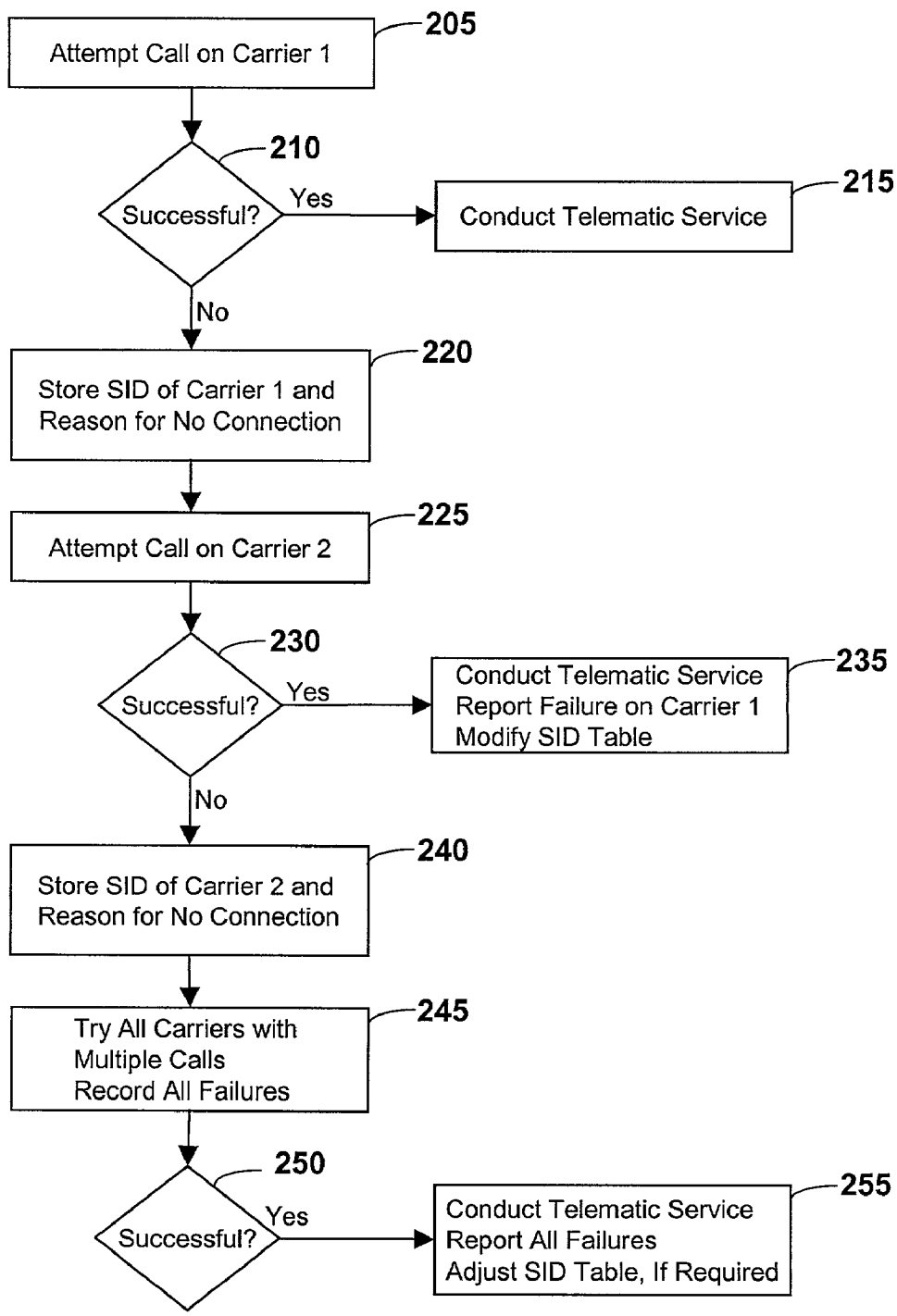
FIG. 2 is a flow diagram of one embodiment of a method for reporting telemetric service failures in accordance with the current invention.

FIG. 2 shows a flow diagram of one embodiment of a method for reporting telemetric service failures in accordance with the present invention at 200. These failures may include connectivity problems as well as data transfer failures. As seen in block 205, a telemetric service call may be initiated on a first wireless carrier system 120 by in-vehicle mobile phone 168 in mobile vehicle 110 of FIG. 1.

A call connection may or may not be successful, as seen at block 210. When successful, telemetric unit 150 may be connected via wireless carrier system 120 and telephone network 130, as seen at block 215.

When a call request fails, telemetric unit 150 may determine on which wireless carrier system 120, 122 the call failed and the reason for no connection as seen at block 220. The vehicle identification number (VID), system identifier (SID) of wireless carrier system 120, call type, failure type, time, and location of mobile vehicle 110 when the failure occurred may be stored in telemetric unit 150.

A system identifier may be a 15-bit designation that identifies a specific cellular service provider and a specific cellular market. The system identifier may be the system identifier of analog or digital wireless carrier system 120 to which the mobile phone is subscribed. The system identifier may be a code that is associated with wireless carrier system 120, 122. The system identifier of wireless carrier system 120, 122 may be a system identifier associated with the cellular market where the mobile phone is located.

A system identifier (SID) table may reside within telemetric unit 150. The SID table may reside within in-vehicle mobile phone 168. The SID table may reside within mobile vehicle 110. The SID table may be a priority list of preferred carriers.

The telemetric service call may be attempted on a second wireless carrier system 122 as seen at block 225. A call connection may or may not be successful, as seen at block 230.

When the call for telemetric service is connected successfully, as seen at block 235, a report of the failure on first wireless carrier system 120 may be sent automatically to telemetric call center 140. It may also be sent at a prescribed time interval or in response to a query by telemetric call center 140. The report may include information such as the VID, SID, failed call type, failure type, time, and location of mobile vehicle 110.

When the attempted call on second wireless carrier system 122 is unsuccessful, telemetric unit 150 may determine on which wireless carrier system 120 the call failed and the reason for no connection, as seen at block 240. The VID, SID, call type, failure type, time, and location of mobile vehicle 110 when the failure occurred may be stored in telemetric unit 150.

When calls have failed on wireless carrier system 120 and wireless carrier system 122, there may be multiple call attempts on other wireless carriers listed in the SID table at seen at block 245.

A call connection may or may not be successful, as seen at block 250. When the call for telemetric service is successful, the information on the SIDs of all wireless carrier systems 120, 122 and reasons for no connectivity may be recorded and stored in a similar manner to that of other failed calls, as seen at block 255.

Figure 3:
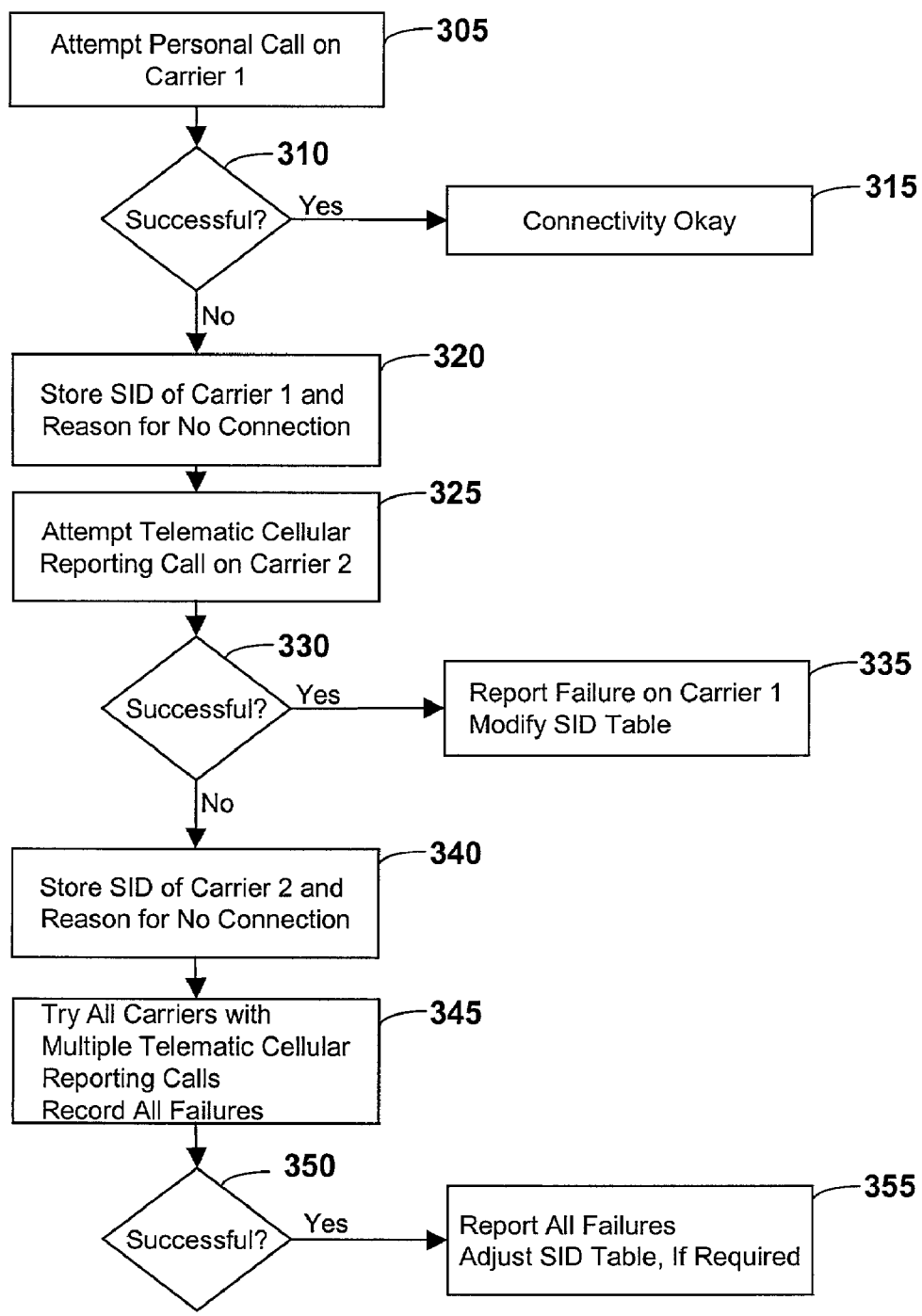
FIG. 3 is a flow diagram of one embodiment of a method for reporting personal call failures in accordance with the current invention.

FIG. 3 shows a flow diagram of one embodiment of a method for reporting personal call failures in accordance with the present invention at 300. As seen in block 305, a personal call may be initiated on a first wireless carrier system 120 by in-vehicle mobile phone 168 of mobile vehicle 110.

A call connection may or may not be successful, as seen at block 310. When successful, in-vehicle mobile phone 168 may be connected via wireless carrier system 120 and telephone network 130, as seen at block 315.

When a call request fails, telemetric unit 150 may determine on which wireless carrier system 120, 122 the personal call failed and the reason for no connection as seen at block 320. The VID, SID, call type, failure type, time, and location of mobile vehicle 110 when the failure occurred may be stored in telemetric unit 150.

A telemetric service call may be attempted on a second wireless carrier system 122, as seen at block 325. A call connection may or may not be successful, as seen at block 330.

When the call for telemetric service is connected successfully, as seen at block 335, a report of the failure on first wireless carrier system 120 may be sent to telemetric call center 140 automatically, at a prescribed time, or in response to a call center query. The report may include information such as the SID of wireless carrier system 120, call type, failure type, time, and location of mobile vehicle 110.

When the telemetric call on second wireless carrier system 122 is unsuccessful, telemetric unit 150 may determine on which wireless carrier system 120 the call failed and the reason for no connection as seen at block 340. The VID, SID, call type, failure type, time, and location of mobile vehicle 110 when the failure occurred may be stored in telemetric unit 150.

When calls have failed on wireless carrier systems 120, 122, there may be multiple telemetric call attempts on other wireless carriers listed in the SID table, at seen at block 345. The attempts may be continued automatically, at a prescribed time or in response to a query by a telemetric call center 140.

A call connection may or may not be successful, as seen at block 350. When the call for telemetric service is successful, the information on the SID identifiers of all wireless carriers including wireless carrier systems 120, 122, and reasons for no connectivity may be recorded and stored in a manner similar to that of other failed calls as seen at block 355.

Figure 4:
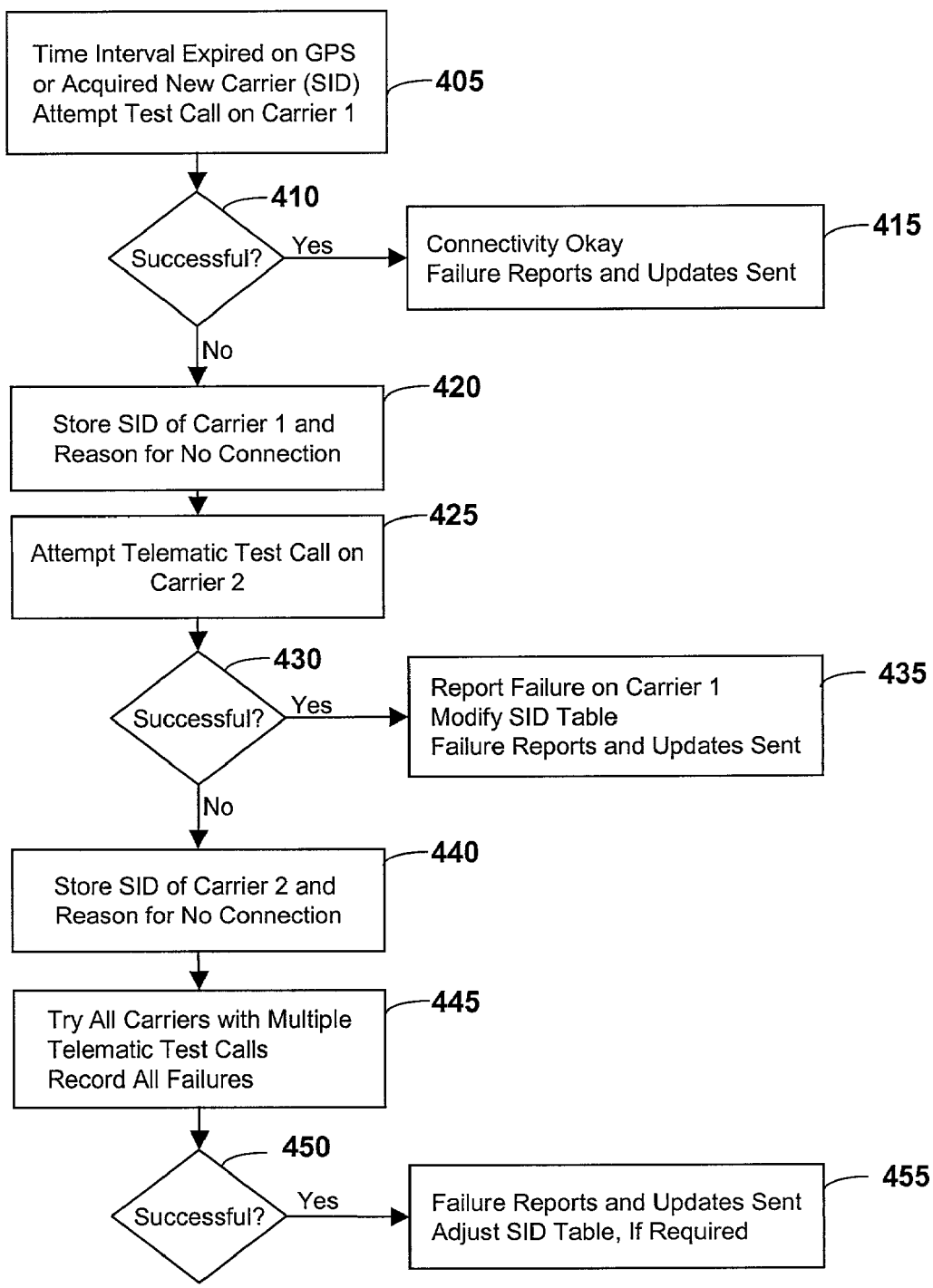
FIG. 4 is a flow diagram of one embodiment of a method of a proactive method of independently testing for connectivity of a mobile vehicle in accordance with the current invention.

FIG. 4 shows a flow diagram of one embodiment of a proactive method of independently testing for connectivity of a mobile vehicle, in accordance with the present invention at 400. Mobile vehicle 110 may be running or turned off. As seen in block 405, a test call to telemetric call center 140 may be attempted on first wireless carrier system 120. The call may be attempted after a certain lapsed time that is prescribed by telemetric unit 150 and determined by a time stamp from GPS unit 164. The test call may be attempted in response to a query by telemetric call center 140, which may need to update or reconfigure the SID table with the SID of a new wireless carrier. Additionally, telemetric call center 140 may update other modem, phone or telemetric software applications.

A call connection may or may not be successful, as seen at block 410. When the test call is successful, failure reports from telemetric unit 150 and any phone, modem, and telemetric unit updates from the telemetric call center 140 may be sent, as seen at block 415.

When a call request fails, telemetric unit 150 may determine on which wireless carrier system 120 the call failed and the reason for no connection, as seen at block 420. The VID, SID, call type, failure type, time, and location of mobile vehicle 110 when the failure occurred may be stored in telemetric unit 150.

A telemetric test call may be attempted on a second wireless carrier system 122 as seen at block 425. A call connection may or may not be successful, as seen at block 430.

When the call for telemetric service is connected successfully, as seen at block 435, a failure report may be sent from telemetric unit 150 and any phone, modem, and telemetric unit updates from telemetric call center 140 also may be sent.

When the telemetric call on second wireless carrier system 122 is unsuccessful, telemetric unit 150 may determine on which wireless carrier system 122 the call failed and the reason for no connection as seen at block 440. The unique SID of wireless carrier system 120, call type, failure type, time, and location of mobile vehicle 110 when the failure occurred may be stored in telemetric unit 150.

When calls have failed on the wireless carrier system 120 and wireless carrier system 122, there may be multiple telemetric call attempts on other wireless carriers listed in the SID table, as seen at block 445.

A call connection may or may not be successful, as seen at block 450. When the telemetric test call is successful, the information on the SID of wireless carrier systems 120, 122 and reasons for no connectivity may be recorded and stored in a similar manner to that of other failed calls, as seen at block 455.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method of reporting connectivity of a mobile vehicle, comprising:
   receiving a failed call request;
   determining a failure type of the failed call request;
   determining a time of the failed call request;
   determining a location of the vehicle when the failed call request occurred;
   storing the failure type, the time of the failed call request, and the location of the vehicle when the failed call request occurred; and
   updating an in-vehicle wireless modem based on the failure type, the time of the failed call request, and the location of the vehicle when the failed call request occurred.

2. The method of claim 1 wherein the failure type is selected from a group consisting of an intercept notification, a reorder notification, an access denied notification, a mobile phone failure notification, a carrier-loss timeout notification, a data transfer failure notification, and a wireless modem failure notification.

3. The method of claim 1 wherein the time of the failed call request is based on a global positioning system unit time stamp.

4. The method of claim 1 wherein the location of the vehicle when the failed call request occurred is comprised of a longitude coordinate output and a latitude coordinate output from a global positioning system unit.

5. The method of claim 1, further comprising:
   updating an in-vehicle system identifier table based on the failure type, the time of the failed call request, and the location of the vehicle when the failed call request occurred.

6. The method of claim 1, further comprising:
   sending the failure type, the time of the failed call request, and the location of the vehicle when the failed call request occurred to a call center database.

7. The method of claim 6 wherein the failure type, the time of the failed call request, and the location of the vehicle when the failed call request occurred to the call center database is sent automatically.

8. The method of claim 6 wherein the failure type, the time of the failed call request, and the location of the vehicle when the failed call request occurred to the call center database is sent periodically.

9. The method of claim 6 wherein the failure type, the time of the failed call request, and the location of the vehicle when the failed call request occurred to the call center database is sent in response to a query from a call center.

10. The method of claim 6, further comprising:

sending an update instruction from the call center to the mobile vehicle to reconfigure a system identifier table.

* * * * *